(12) United States Patent
Bubenicek

(10) Patent No.: US 11,255,066 B2
(45) Date of Patent: Feb. 22, 2022

(54) METHOD FOR PRODUCING A COMPONENT FREE OF TOE PRESSURE

(71) Applicant: Keller Holding GmbH, Offenbach/Main (DE)

(72) Inventor: Michal Bubenicek, Offenbach/Main (DE)

(73) Assignee: KELLER HOLDING GMBH, Offenbach/Main (DE)

(*) Notice: Subject to any disclaimer, the term of this patent is extended or adjusted under 35 U.S.C. 154(b) by 8 days.

(21) Appl. No.: 17/022,074

(22) Filed: Sep. 15, 2020

(65) Prior Publication Data
US 2021/0079618 A1   Mar. 18, 2021

(30) Foreign Application Priority Data
Sep. 17, 2019 (EP) .................................. 19197701

(51) Int. Cl.
*E02D 27/28* (2006.01)
*E02D 3/12* (2006.01)
*E02D 5/46* (2006.01)

(52) U.S. Cl.
CPC .............. *E02D 27/28* (2013.01); *E02D 3/12* (2013.01); *E02D 5/46* (2013.01)

(58) Field of Classification Search
CPC combination set(s) only.
See application file for complete search history.

(56) References Cited

U.S. PATENT DOCUMENTS 3,818,712 A * 6/1974 Burt .................. E02D 17/18
  405/229
2020/0291755 A1* 9/2020 Verbist .................. E21B 43/025

FOREIGN PATENT DOCUMENTS

| DE | 3033715 | 4/1982 |
| DE | 3424776 | 1/1986 |
| DE | 102006007144 | 10/2006 |
| DE | 102018123794 | 10/2019 |
| EP | 3118376 | 1/2017 |

OTHER PUBLICATIONS

Niederleithinger, "Optimization and expansion of the parallel seismic method for determining the length of foundation piles," Dissertation, University of Potsdam, 2010, 221 pages.
EPO, European Search Report for EP Application No. 19197701.6, dated Jun. 19, 2020.

* cited by examiner

*Primary Examiner* — Kyle Armstrong
(74) *Attorney, Agent, or Firm* — Hodgson Russ LLP (57) ABSTRACT

The invention relates to a method for producing a component, such as a structural member, free of toe pressure, including the steps of: introducing a soluble material into soil and introducing a component into the soil on the soluble material.

20 Claims, 4 Drawing Sheets

METHOD FOR PRODUCING A COMPONENT FREE OF TOE PRESSURE

CROSS-REFERENCE TO RELATED APPLICATION

This application claims priority to European Patent Application No. 19197701.6, filed Sep. 17, 2019, the entire disclosure of which is incorporated herein by reference.

TECHNICAL FIELD

The present invention relates to a method for producing a component, such as a structural member, with reduced, or free of, toe pressure.

BACKGROUND

The foundations of structures consist of components for basic construction such as slabs, beams, stones or deep foundation elements. The deep foundation elements are often designed in the shape of piles, and in this, case absorb the load of the structures at the vertically upper end of the deep foundation element, the column head, and transfer this into the soil, which can also be referred to as the building ground. This is done on the one hand by the toe pressure, which results from the support of the vertically lower end of the deep foundation element, the column base, in the ground. On the other hand, the load from the structure is absorbed by the surface friction between the soil and the lateral surface of the deep foundation element.

The ratio of the two resistance components of toe pressure and surface friction depends largely on the nature of the soil. In order to be able to exactly determine the load-bearing capacity of deep foundation elements, it is necessary that the toe pressure and the surface friction are determined separately from one another.

DE 34 24 776 A1 discloses a method for determining the load-bearing capacity of piles, in which the pile is divided into an upper and a lower section. A press is provided between the upper section and the lower section and a load cell is provided on the pile base. The subdivision of the pile is chosen so that the sum of the surface friction of the upper pile section and its weight are equal to the sum of the surface friction of the lower pile section and the toe pressure. By measuring the press force and the toe pressure using the load cell on the pile base, all resistance components can be determined mathematically.

DE 10 2006 007 144 A1 discloses a pile lifting cushion for measuring the load-bearing capacity of a bored pile, which is designed as an annular bellows joint and is arranged between the upper and lower pile parts. By pumping up the pile lifting cushion with a liquid, the upper and lower pile parts can be displaced so that the surface friction can be determined from the resulting displacements and the pressure in the pile lifting cushion.

Based on this, the object of the invention is to provide a method with which a component can be simply and cost-effectively produced without toe pressures.

SUMMARY

To achieve the object, a method for producing a structural member, such as a foundation component, with reduced or free of toe pressure is proposed, comprising the steps of: introducing a soluble material into a soil and introducing a component into the soil on the soluble material.

Due to the solubility of the material introduced into the soil, said material dissolves in a moist building ground as time progresses, so that an empty or liquid-filled chamber is created below the component in the area in which the soluble material was introduced. The component is thus only supported by the surface friction and toe pressure no longer acts on the component. In this respect, the method is particularly well suited for determining the surface friction of components and/or for structures that should not have any load-bearing influence on the ground areas below. In principle, any element can be introduced into the ground as a component, in which surface friction is formed with the surrounding soil after the introduction. In particular, a lateral surface of the component can be in contact with the soil after it has been introduced.

The method according to the invention has the advantage that no measuring device has to remain in the component itself or in the building ground to measure the total surface friction after the surface friction measurement has been completed. Furthermore, the introduction of the soluble material into the building ground can be integrated into the known methods of manufacturing a component for the foundation without a ground processing tool having to be driven into the ground while the foundation hole is being worked. Furthermore, the method can be used for producing components that are erected above an existing underground structure, for example, a tunnel, to which no further loads are to be transferred directly. Due to the resulting empty chamber between the component and the structure, vibrations, for example, cannot be transmitted directly from the structure to the component and vice versa. The method according to the invention can be used for the production of components, the column base of which is arranged both above and below the water table. Furthermore, the method according to the invention can be used both for components with reinforcement and for components without reinforcement.

The soluble material is introduced into the soil below a desired final depth of the component to be produced. After the introduction of the soluble material, the component is created thereon, so that it is temporarily supported underneath on the soluble material after the introduction. In the context of the present disclosure, soluble material is intended to conceptually include such material that is initially in a load-bearing, in particular solid, state in order to temporarily support the structural component arranged thereon, and that can be dissolved or liquefied independently in the soil under the action of liquid and/or temperature change, so that the end-side support of the component disappears at a later point in time. The component is then only borne by the surface friction and has reduced or is free of toe pressure at the lower end. In particular, the soluble material can be a water-soluble material, which has the advantage that the material dissolves by itself in moist soils.

In one possible embodiment of the method, a material with a solubility in water of at least 33 g/l water, in particular at least 100 g/l water, can be selected as the soluble material. This ensures that the water-soluble material can dissolve in the existing moisture in the soil and that an empty chamber is created below the component within a period of time that is normal for the production of components.

In a further possible embodiment of the method, a liquid, in particular water, can be added to the soluble material before and/or after the component is introduced, for example by pouring or by means of a hose, pipe or lance. The addition of the liquid can in particular take place in such a way that cavities of the soluble material are filled with the liquid. The method can thus also be used in areas with very low soil moisture, in particular in areas with very low groundwater levels, and the dissolving of the soluble material can be ensured in a sufficiently short period despite the low soil moisture.

The soluble material is preferably a solid. The soluble material can, in one possible embodiment of the method, be selected from the group of salts, the group of sugars, the group of acids or combinations thereof and/or can contain at least one liquid made of cellulose and one frozen liquid. In particular, rock salt can be used as the soluble material from the group of salts. From the group of acids, in particular potassium chloride or potassium sulphate can be used as soluble material. In addition, at least one of the microelements zinc, manganese, iron, selenium and copper can be added to the soluble material in order to increase the solubility in water.

Alternatively or additionally, the solubility of the material can also be improved by introducing the soluble material in several layers in the ground, wherein an intermediate layer made of liquid-permeable, non-soluble or non-cohesive material is introduced onto a layer with soluble material. A layer of soluble material can then be applied again to the permeable intermediate layer, which can also be referred to as an insert. Groundwater can flow through a water-permeable insert so that adjacent layers of soluble material are saturated with water from several sides and the dissolving time is reduced. Non-cohesive or grainy material, such as gravel, is preferably used as the intermediate layer. This means that less soluble material can also be introduced. It is also conceivable that a material for the intermediate layer has a high absorption of a liquid. At a later point in time, it can release the liquid absorbed before introduction into the soluble material. Any intermediate layers and layers of soluble material can be used in combination to produce a cavity.

According to an alternative or additional embodiment, the soluble material can contain a frozen liquid, in particular frozen water, in particular in the form of ice cubes. In this context, solubility in the meaning of the present invention is also to be understood as the transition of the liquid during thawing from the solid aggregate state in the frozen state to the liquid aggregate state. It is understood that combinations of the embodiments mentioned are also possible, for example the use of a soluble material from the group of salts, the group of sugars or the group of acids, and the use of an intermediate layer of ice cubes.

In a possible embodiment of the method, a material which, when completely dissolved in water, has a pH of at least 6.0, in particular of at least 6.5, more particularly of at least 6.8, and a maximum of 8.0, and a maximum of 7.5, in particular a maximum of 7.2, can be selected as the soluble material. It can thus be ensured that the introduction of the soluble material into the soil does not cause any significant change in the pH value of the soil itself or of the groundwater.

In a further possible embodiment of the method, after the component has been introduced, a rest period can be observed before a significant external load is applied to the component. During the rest period, the soluble material at least partially dissolves, so that a cavity is created under the component. A significant external load should be understood to mean that the component is loaded with more than 10% of the load-bearing capacity of the component in the finished state. The rest period depends on various factors, such as the choice of soluble material, introduction of the material in one or more layers, soil properties, etc. In this respect, the rest period can be adjusted as required depending on the solubility of the soluble material and/or a moisture content of the soil and/or the nature of the component. At least 4 days, in particular at least 10 days, more particularly at least 20 days, and especially at least 25 days and/or up to 28 days, can be selected as the rest period, wherein shorter times are also possible when using ice cubes as the soluble material. By observing the rest period, it can be ensured that the dissolving of the soluble material in the moisture of the soil at the end of the rest period has progressed to such an extent that, when the load is applied, the component base rests on a remnant of the soluble material and any distortion of the measurement of the surface friction can be ruled out. In particular, it can be sufficient that around 50% of the volume of the soluble material is dissolved or liquefied within the rest period. In this case, the rest period is shorter than a dissolving time of the soluble material, in which the soluble material can completely dissolve.

Furthermore, the soluble material can be compacted before or during the introduction of the component. The compaction can in particular take place in such a way that the strength and/or the rigidity of the soluble material corresponds at least to the product of the height of the component and the specific weight of the component immediately after the introduction of the component. The soluble material will therefore not yield under the pressure of the component directly after the component has been introduced, so that an exact vertical positioning of the component within the ground is guaranteed.

In a further possible embodiment of the method, the soluble material can also be compacted in such a way that a width of the soluble material is equal to or greater than a width of the component to be created thereon. This ensures that the foot of the component rests completely on the soluble material immediately after the component has been introduced. After the dissolving of the soluble material, there is no longer any toe pressure acting on the base of the component. The component itself is also prevented from forming an annular base which is widened in relation to the remaining width of the component or the positioning element and thus forms a bearing surface on which a toe pressure can act.

In a further possible embodiment of the method, the soluble material can also be compacted in such a way that a height of the soluble material corresponds at most to the simple width of the component, in particular to a maximum of half the width of the component. This procedure allows on the one hand a sufficiently large cavity to be formed underneath the component and, on the other hand, the smallest possible amount of soluble material to be introduced into the soil.

In a further embodiment of the method, the surface friction of the component can be determined after the component has been introduced. This can be done by the usual methods for determining the surface friction, in particular by applying a force to the head of the component via a hydraulic press or a ramming impact in the direction of a longitudinal axis of the component.

In a further development of the method, in addition to the component produced according to the invention, a further component can be introduced into the soil, wherein the further component has the same dimensions as the component and is introduced into the ground in such a way that a toe pressure acts on the further component from the ground. After the introduction of the further component, the total resistance of the further component can be determined. From the total resistance of the further component and the surface friction of the component, the toe pressure resistance of the further component can be determined. The maximum distance between the further component and the component can be selected so that the further component is introduced into a part of the soil, the characteristics of which are comparable to the part of the soil into which the component was introduced. It is conceivable that a group of more than one component can be loaded at once and therefore the total load-bearing capacity of the group can be determined.

In one embodiment of the method, the soluble material can be introduced into the soil and the component introduced into the soluble material by means of a vibration method. A foundation hole is worked into the soil by means of an immersion vibrator or vibro hammer. The soluble material is introduced into the foundation hole via a sluice at the tip of the vibrator and compacted in the foundation hole by the vibrator. When using pourable or flowable or non-cohesive building material, the component can subsequently also be introduced onto the material via the sluice of the vibrator, for example in the form of cement, concrete, mortar, ballast or gravel. Alternatively, a prefabricated component, such as a post made of reinforced concrete or wood or a steel pipe with an open or closed base, can be pressed into the soil until the soluble material is reached.

In a further embodiment of the method, the soluble material can be introduced into the soil and the component introduced onto the soluble material by means of a jacking pipe method. Here, a jacking pipe is driven, pressed or rammed into the ground so that a foundation hole is worked into the soil. After reaching a target depth, the lower end of the jacking pipe is opened, for example by cutting the head end or opening a sluice. The jacking pipe is pulled out of the soil. In parallel to this, first the soluble material and then the foundation material are introduced into the foundation hole through the lower end of the jacking pipe.

In a further possible embodiment of the method, the soluble material can be introduced into the soil and the component introduced onto the soluble material in a borehole produced by a boring method. In this connection, a boring tool is sunk into the soil and then removed from the soil again after reaching the end position. The resulting borehole can be secured by a support tube or a support liquid during the sinking or after the withdrawal of the boring tool. The component can then be introduced into the borehole.

In a further possible embodiment of the method, a foundation hole can be worked into the soil and that the soluble material can be added as a soluble positioning element from a bottom of the foundation hole up to a target fill level. This allows the component to be positioned at a defined height within the foundation hole. In addition, a sufficiently large cavity below the component can be ensured after the soluble material is dissolved.

The method according to the invention can be used analogously for further fully displacing processes, for example tamped columns, for partially displacing processes and their combinations, for example partial displacement bored piles, for drilling processes and for micropiles.

BRIEF DESCRIPTION OF THE DRAWINGS

Preferred embodiments of the method according to the invention are described in the following figures. In the drawings:

FIG. 1 shows a method according to the invention for producing a component with reduced or free of toe pressure in a first embodiment, A) after sinking a filling device,
B) after introducing soluble material into the ground,
C) after compacting the soluble material,
D) while the component is being introduced on the soluble material,
E) after manufacturing the component,
F) after dissolving the soluble material;

FIG. 2 shows a method according to the invention for producing a component with reduced or free of toe pressure in a second embodiment, A) after sinking a filling device,
B) after introducing soluble material into the ground,
C) while the component is being introduced on the soluble material,
D) after manufacturing the component,
E) after dissolving the soluble material;

FIG. 3 shows a method according to the invention for producing a component with reduced or free of toe pressure in a third embodiment, A) after sinking a boring tool,
B) after removing the boring tool,
C) after introducing soluble material into the ground,
D) while the component is being introduced on the soluble material,
E) after manufacturing the component,
F) after dissolving the soluble material; and FIG. 4 shows a method according to the invention for producing a component with reduced or free of toe pressure in a fourth embodiment, A) after introduced a first layer of soluble material into the ground,
B) after introducing an intermediate layer of water-permeable material over the first layer of soluble material into the ground,
C) after introducing a second layer of soluble material on the deposit of water-permeable material in the ground,
D) during the introduction of the component on the soluble positioning element,
E) after manufacturing the component,
F) after dissolving the soluble material.

DETAILED DESCRIPTION

A first embodiment of the method according to the invention is shown in FIGS. 1A to 1F, which are described jointly below. In the first process step V1 of the method according to the invention, a foundation hole 2 is worked into a soil 3 with a soil displacer 1, for example an immersion vibrator. The foundation hole 2 has a target depth T1. In the illustrated case, the width B2 of the foundation hole 2 largely corresponds to the width B1 of the soil displacer 1. It is also conceivable, especially if an immersion vibrator is used as the soil displacer 1, that the width B2 of the foundation hole 2 is greater than the width B1 of the soil displacer 1. The soil displacer can also be designed in the form of a pipe.

After the target depth T1 has been reached by the soil displacer 1, the soil displacer 1 is moved out of the soil 3 by the target filling height H1 in a second process step V2. In parallel with this, a soluble material 4, in particular water-soluble material, such as rock salt and/or ice cubes, is introduced into the chamber 6 created through a sluice (not shown) at the head of the soil displacer 1. This can be done either solely through the weight of the soluble material 4 or additionally through the support of compressed air.

In an optionally subsequent process step V3, the soluble material 4 is pressed or stuffed into the soil 3 by moving the soil displacer 1 up and down and, if necessary, compacted with the addition of further soluble material 4. The soluble material 4 forms a stable body 5 at the bottom of the foundation hole 2, on which a component 8 to be produced can be temporarily supported or positioned. To this extent, the soluble material 4 in this state can also be referred to as a support body or positioning element 5. Compaction leads to widening of the chamber 6 in a direction perpendicular to the movement of the soil displacer 1, so that a widened chamber 6' is created which is completely filled by the positioning element 5. As a result of the widening, the widened chamber 6' has a width B2' which is greater than the width B2 of the foundation hole 2, and at the same time represents the width of the positioning element 5. The widened chamber 6' or the positioning element 5 also has the actual filling level H1', which, depending on the configuration of the compaction, can also differ from the target filling level H1 but may also be the same as the target filling level H1.

In the following process step V4, the soil displacer 1 is lifted; into the cavity created in this way above the soluble material 4, the foundation material 7 of the building component 8 to be produced, for example cement, concrete, mortar, ballast and/or gravel, is introduced into the foundation hole 2 through the previously mentioned sluice at the head of the soil displacer 1, onto the soluble material 4 or the support body 5 and the foundation material 7 is compacted by moving the soil displacer 1 up and down. The procedure is repeated until the foundation hole 2 is filled with the foundation material 7 up to a desired height H2, in the present case up to the surface of the ground, and the component 8 is formed. This results in a jacket-like frictional contact between the foundation material 7 or the component 8 formed therefrom with the in-situ soil. The component 8 has a width B3 at the lower end, the base, which in the present case largely corresponds to the width B2 of the foundation hole 2. However, it is also conceivable that the width B3 is greater than the original width B2 of the foundation hole 2 due to the stuffing of the foundation material. In the present case, the width B3 at the base of the component 8 is smaller than the width B2' of the positioning element 5 or the chamber 6' filled thereby. This ensures that the component 8 rests completely on the soluble material 4 at the lower end. However, it is also conceivable that the width B3 at the base of the component 8 is smaller than the width B2' of the positioning element 5 or the chamber 6' filled thereby.

Subsequently, in process step V5, a rest period is observed before the component 8 undergoes a significant external load. This means in particular that the component 8 is loaded with less than 10% of its load-bearing capacity. During this time, the soluble material 4 or the support body 5 is gradually dissolved by the moisture content of the soil 3 in the area of the widened chamber 6'. The rest period is chosen so that at the end of the rest period the soluble material 4 has dissolved, in the present case completely dissolved such that a cavity is formed below the component 8.

In a final process step V6, the component 8 can then be subjected to a force F, wherein the component 8 is supported only by the surface friction between the lateral surface of the component 8 and the soil 3. A toe pressure cannot counteract the force F due to the at least partially empty chamber 6' below the component 8. The force F can result, for example, from a structure or a building, in particular an above-ground building, which is to be supported by the component, or it can be applied mechanically or hydraulically for load-bearing capacity analysis of the component, in particular the surface friction.

Alternatively, the immersion vibration method can be designed in such a way that method step V3 with the compaction of the soluble material 4 and the compaction of the foundation material 7 in method step 4a are omitted.

Figure 1:
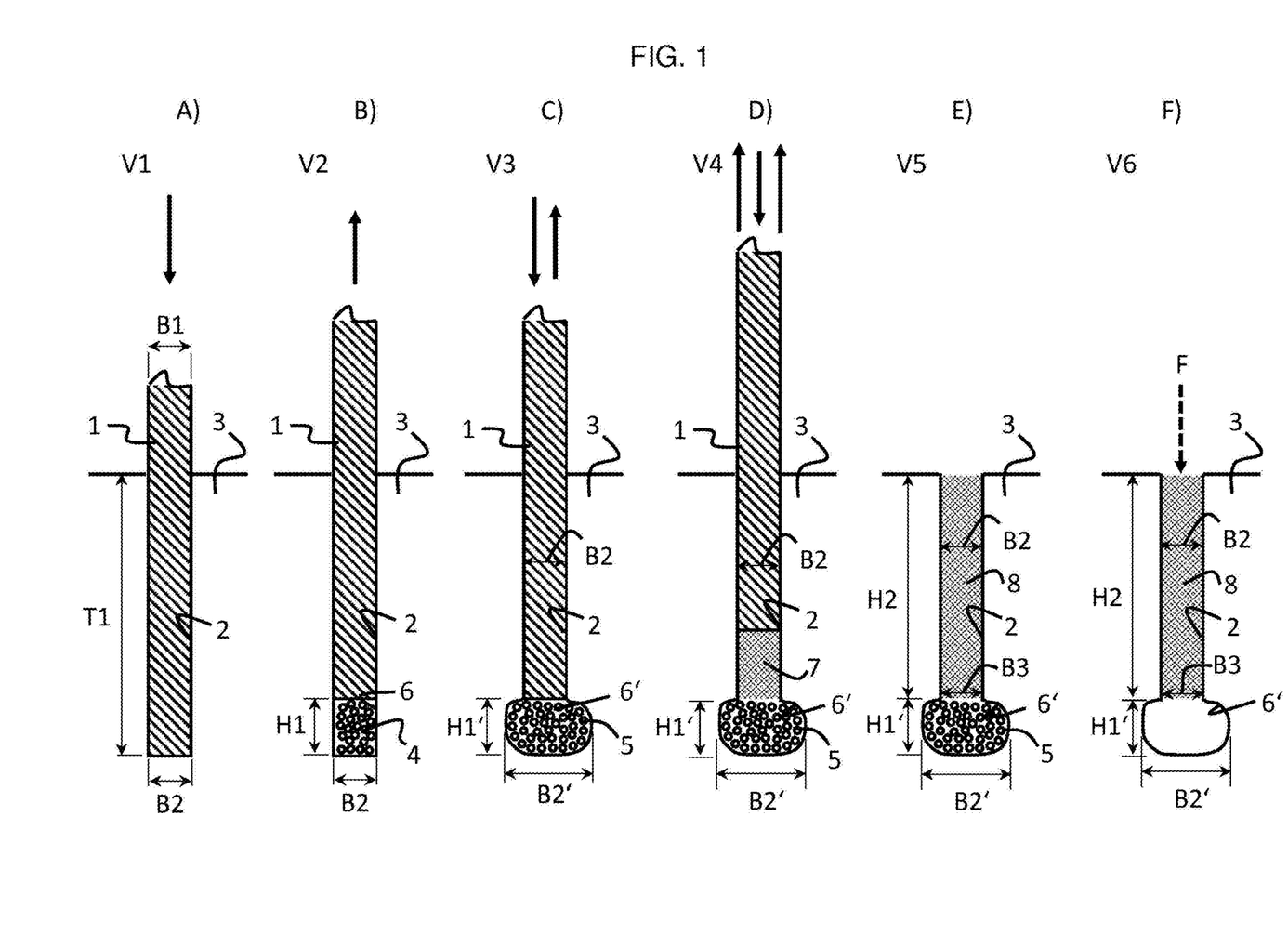

By eliminating the compaction of the soluble material 4 in and of the foundation material 7, the alternative immersion vibration method can be used for time-efficient production of simple components. Due to the lack of compaction of the soluble material 4, the width B3 at the foot of the component 8 corresponds to the width B2 of the soluble material 4 or of the cavity formed as a result after it has been dissolved. So that the load from the weight of the component 8 on the soluble material 4, in particular directly after the foundation material 7 has been poured into the foundation hole 2, does not lead to an undesired high degree of compaction of the soluble material 4 and sagging of the component 8, the nature of the soluble material 4 can be selected such that a high bulk density of the soluble material 4 is achieved as soon as the soluble material 4 is filled. This can be achieved, for example, by a fine grain size and by the high flowability of the soluble material 4.

A second embodiment of the method according to the invention for producing a component free of toe pressure is shown in FIGS. 2A to 2E, which are described jointly below. In a first process step V1a, a jacking pipe 12 with a width B5 is rammed, drilled, screwed or pressed into the soil 3 to a desired depth T1, so that a foundation hole 2 is formed that has a width B2. In a subsequent process step V2a, the soluble material 4 is added the foundation hole 2 through the core of the jacking pipe 12 via a sluice (not shown) of the jacking pipe 12 and the jacking pipe 12 is pulled a specific distance out of the soil 3. After the soluble material 4 has been introduced up to a filling level H1, in a further process step V4a the foundation material 7 is poured into the foundation hole 2 through the core of the jacking pipe 12 and the jacking pipe 12 is again pulled out of the soil 3. After the target height H2 has been reached, the jacking pipe 12 is completely removed from the foundation hole 2. The component 8 is thus formed from the introduced foundation material 7 and has a width B3 which is equal to the width B2 of the foundation hole 2. In a subsequent process step V5, analogously to the first embodiment of the method according to the invention, a rest period follows before the component 8 undergoes a significant load. Finally, in a method step V6, as already explained above, the component 8 can be loaded with a force F.

A third embodiment of the method according to the invention for the production of a component free of toe pressure is shown in FIGS. 3A to 3F, which are described jointly below. In method step V1b, a boring tool 9 with the width B4 is used to drill a foundation hole 2 with a width B2 in the soil 3 to a target depth T1. When using a drilling method, the width B2 and the width B4 can be identical, i.e. there is no significant displacement of the soil, but material is discharged from the soil. However, this does not apply to what is known as a partial displacement drilling process, in which the larger core tube results in a certain lateral displacement of the in-situ ground. In parallel with the boring process, a support tube 10 is inserted from the bottom of the foundation hole 2 into the foundation hole 2 to below a target filling height H1. The support tube 10 prevents the lateral surface of the foundation hole 2 from being damaged during the introduction of the soluble material 4 and the foundation material 7 into the foundation hole 2, in particular prevents soil from being carried along into the foundation hole 2. It is also conceivable that such a support tube 10 is dispensed with. In this case, the foundation hole 2 can either be completely dispensed with or, instead of the support tube 10, a supporting liquid can be introduced into the foundation hole 2. In a subsequent method step V1b', the boring tool 9 is pulled out of the foundation hole 2 and removed. The support tube 10 initially remains in the foundation hole 2.

Subsequently, in method step V2b, a filling pipe 11 is introduced into the foundation hole 2, which has a funnel element at the upper end which opens into a guide tube having a smaller diameter than the width B2 of the foundation hole 2. The soluble material 4 is filled in through the filling pipe 11 up to the target filling height H1. However, it is also conceivable that the filling pipe 11 is dispensed with and instead the soluble material 4 is poured directly from the upper edge of the foundation hole 2 into the foundation hole 2. Subsequently, in method step V4b, the foundation material 7 is introduced above the soluble material 4 into the foundation hole 2 via the filling pipe 11 until the desired target height H2 above the soluble material 4 is reached. The support pipe 10 and the filling pipe 11 are continuously pulled out of the foundation hole 2 in this process. This can be done either in parallel or sequentially, wherein the support tube 10 can always be guided below a current filling level. If the foundation material 7 is introduced above the groundwater level, the filling pipe 11 can always be guided above the foundation material 7 that has been filled in. If the foundation material 7 is introduced below the groundwater level, a contract pipe can be used as the filling pipe 11 and guided in such a way that the outlet of the contract pipe is always immersed in the foundation material 7. This ensures that there is no intermixing of the foundation material 7 with the groundwater or supporting liquid. However, it is also conceivable that a filling pipe 11 is dispensed with and instead the foundation material 7 is poured directly from the upper edge of the foundation hole 2 into the foundation hole 2.

In a method step V5, the support tube 10 and the filling pipe 11 are removed from the foundation hole 2 and, analogously to the procedure of the two aforementioned embodiments of the method according to the invention, a rest period is observed before the component 8 undergoes significant external stress. Finally, in a method step V6, as already explained above, the component 8 can be loaded with a force F.

A fourth embodiment of the method according to the invention for producing a component free of toe pressure is shown in FIGS. 4A to 4F, which are described jointly below, which method largely resembles the second embodiment of the method according to the invention described above.

Figure 4:
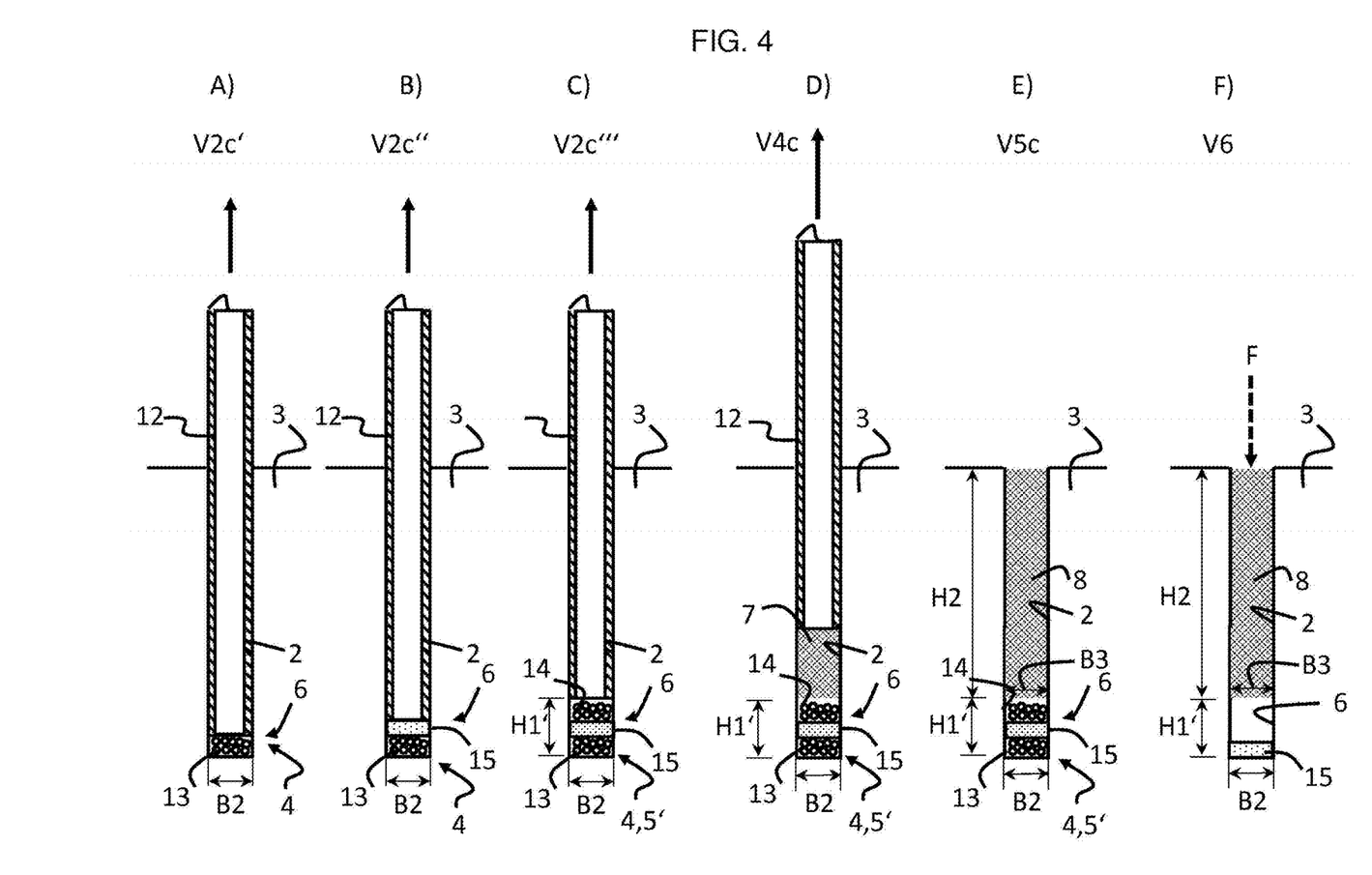

In a modification to the second embodiment, in the fourth embodiment, a soluble positioning element 5' is introduced into the ground such that a first layer 13 and a second layer 14 of the soluble material 4 are separated from one another by a water-permeable intermediate layer 15. In a first process step, which is not shown in the figures, analogously to the first process step Via of the second embodiment of the method according to the invention, a jacking pipe 12 is rammed, drilled, screwed or pressed into the soil 3 so that a foundation hole 2 is formed. In short, reference is therefore made at this point to the explanations relating to process V1a.

In a subsequent process step V2c, which is represented in FIGS. 4A), 4B) and 4C) by the partial process steps V2', V2c''' and V2c''', the first layer 13 of the soluble material is first added to the foundation hole 2 through a sluice (not shown) of the jacking pipe 12 and the jacking pipe 12 is pulled out of the soil 3 bit by bit. A water-permeable intermediate layer 15, which can also be referred to as a deposit, is then applied to the first layer 13 of the soluble material 4. The deposit 15 can have a coarse-grained material such as gravel or ballast, wherein the use of ice cubes is also possible. It is irrelevant whether the material of the deposit itself is soluble or not. A second layer 14 of the soluble material 4 is then applied to the deposit 15. The first layer 13 and the second layer 14 of the soluble material together with the water-permeable deposit 15 form a positioning element 5' which extends from the bottom of the foundation hole 2 to a filling level H1.

Subsequently, in a further process step V4c, the foundation material 7 is added to the foundation hole 2 through the core of the jacking pipe 12 and the jacking pipe 12 is pulled further out of the soil 3. After the target height H2 has been reached, the jacking pipe 12 is completely removed from the foundation hole 2. The component 8 is thus formed from the foundation material 7 that has been introduced and has a width B3 which, in the present embodiment, is equal to the width B2 of the foundation hole 2.

In a subsequent process step V5c, analogously to the process step V5 of the first embodiment of the method according to the invention, a rest period follows before the component 8 undergoes a significant load. The rest period can be reduced here compared to the second embodiment of the method according to the invention, since groundwater can pass through the water-permeable insert 15 and the two layers 13, 14 of the soluble material 4 are each hydrated from several sides so that the soluble material 4 can dissolve more quickly. After the dissolving of the soluble material 4, the water-permeable deposit 15 settles in the bottom area of the foundation hole 2, so that the pile tip of the component 8 is released. Finally, in a method step V6, as already explained above, the component 8 can be loaded with a force F.

Figure 2:
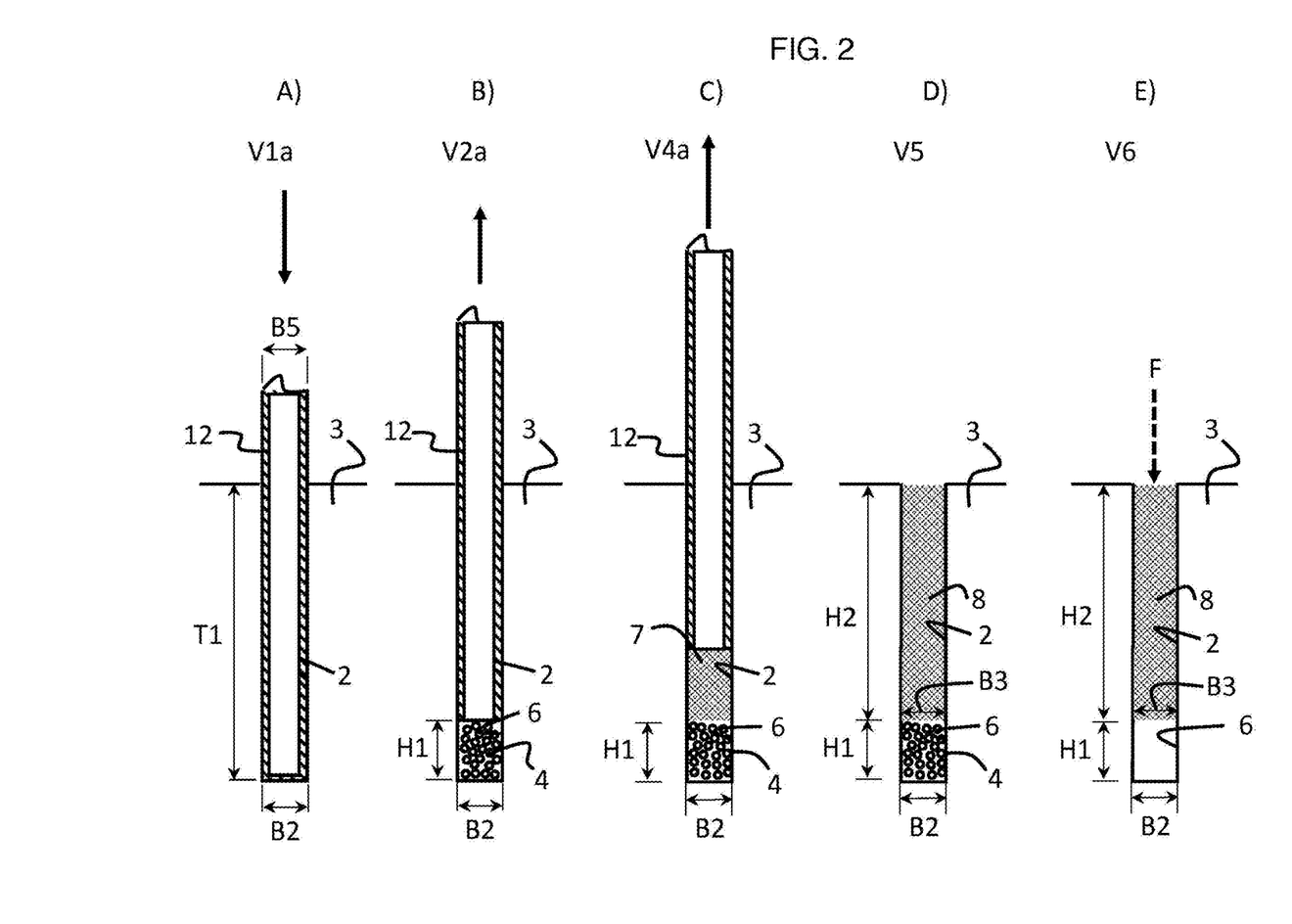
Figure 3:
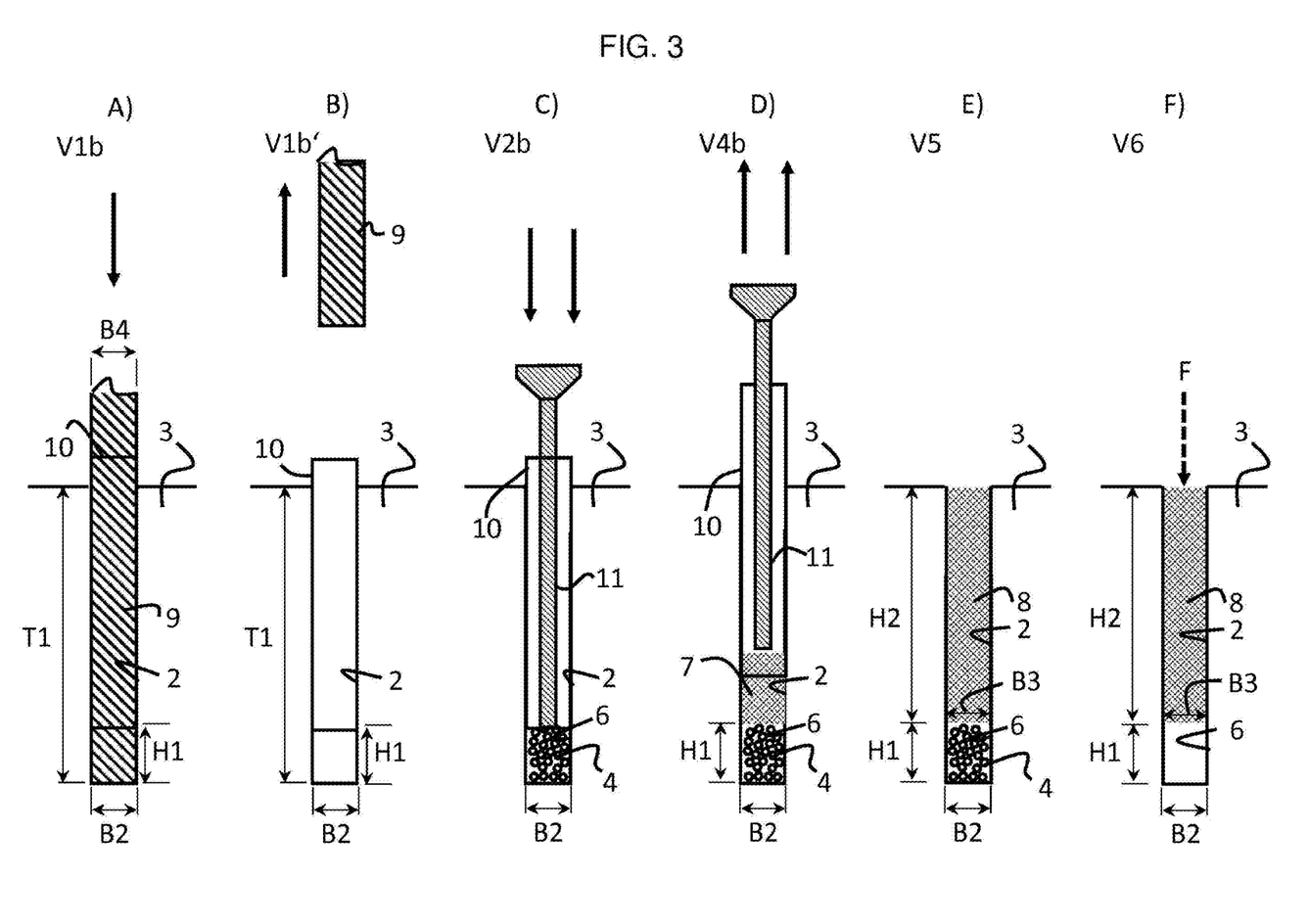

It is understood that a multilayer positioning element according to the present embodiment according to FIG. 4 can also be used analogously in the method according to the invention according to FIGS. 1 to 3, in particular with a boring tool, a soil displacement tool or a combination thereof.

LIST OF REFERENCE NUMERALS

1 Soil displacer
2 Foundation hole
3 Soil
4 Water-soluble material
5 Positioning element
6, 6' Chamber
7 Foundation material
8 Component
9 Boring tool
10 Support pipe
11 Filling pipe
12 Jacking pipe
13 First layer (4)
14 Second layer (4)
15 Intermediate layer
B Width
H Height
T Depth

What is claimed is:

1. A method for producing a structural member with reduced, or that is free of, toe pressure, comprising:
   introducing a soluble material into a soil; and
   introducing the structural member into the soil on the soluble material, wherein one or more of the following:
   the soluble material is a frozen liquid; and
   the soluble material is introduced in several layers, wherein an intermediate liquid-permeable layer is introduced onto a layer with the soluble material.

2. The method according to claim 1, wherein the soluble material is a material with a solubility in water of at least 33 g/l water.

3. The method according to claim 1, wherein the soluble material is a material with a solubility in water of at least 100 g/l water.

4. The method according to claim 1, wherein after the structural member has been introduced, the structural member is subject to a rest period before undergoing an external load;
   wherein the soluble material at least partially dissolves during the rest period, thereby creating a cavity under the component.

5. The method according to claim 4, wherein the rest period is at least 4 days.

6. The method according to claim 4, wherein the rest period is at least 10 days.

7. The method according to claim 4, wherein the rest period is at least 20 days.

8. The method according to claim 1, further comprising forming a foundation hole in the soil; and
   wherein the foundation hole is filled with the soluble material as a soluble positioning element from a bottom of the foundation hole up to a target fill level.

9. The method according to any one of claim 1, wherein:
   before or during the introduction of the component, the soluble material is compacted such that the strength and/or the rigidity of the soluble material corresponds at least to the product of a height of the structural member and a weight of the structural member immediately after the introduction of the component.

10. The method according to claim 9, wherein the soluble material is compacted such that a width of the soluble material is equal to or greater than a width of the structural member to be created thereon and that a height of the soluble material corresponds to a maximum of the single width of the component.

11. The method according to claim 10, the height of the soluble material corresponds to a maximum of half the width of the component.

12. The method according to claim 1, wherein one or more of the following:
   the soluble material is selected from the group consisting of: salts, sugars, and acids; and
   the soluble material contains at least one liquid made of cellulose and one frozen liquid.

13. The method according to any one of claim 1, wherein a micro-element is added to the soluble material, the micro-element being selected from the group consisting of: zinc, manganese, iron, selenium, and copper.

14. The method according to claim 1, wherein the soluble material is selected from a material that, when completely dissolved in water, has a pH of at least 6.0 and a maximum pH of 8.0.

15. The method according to claim 1, wherein the soluble material is selected from a material that, when completely dissolved in water, has a pH of at least at least 6.8 and a maximum pH of 7.2.

16. The method according to claim 1, wherein a liquid is added to the soluble material before or after the introduction of the structural member such that cavities in the soluble material are filled with the liquid.

17. The method according to claim 1, wherein the soluble material is introduced into the soil, and the introduction of the structural member on the soluble material is performed by one of the following: immersion vibration, vibratory hammer, pipe jacking, and drilling a borehole.

18. The method according to any one of claim 1, wherein surface friction of the structural member is determined after the structural member has been introduced.

19. The method according to claim 18, wherein an additional structural member is introduced into the soil, wherein the additional structural member has same dimensions as the component, the additional structural member being introduced into the ground such that a toe pressure acts on the additional structural member from the ground; and
   wherein after the introduction of the further structural member a total resistance of the further structural member is determined; and
   wherein from the total resistance of the further structural member and the surface friction of the structural member the toe pressure resistance of the further structural member is determined.

20. The method according to claim 1, wherein the structural member is a component of a foundation.

* * * * *